Nov. 20, 1934.  F. J. KREUTZER  1,981,420
PROCESS OF PRESERVING HAY
Original Filed Oct. 10, 1932   4 Sheets—Sheet 1

FREDERIC J. KREUTZER, Inventor

By Toulmin & Toulmin
Attorneys

Nov. 20, 1934.  F. J. KREUTZER  1,981,420
PROCESS OF PRESERVING HAY
Original Filed Oct. 10, 1932  4 Sheets-Sheet 2
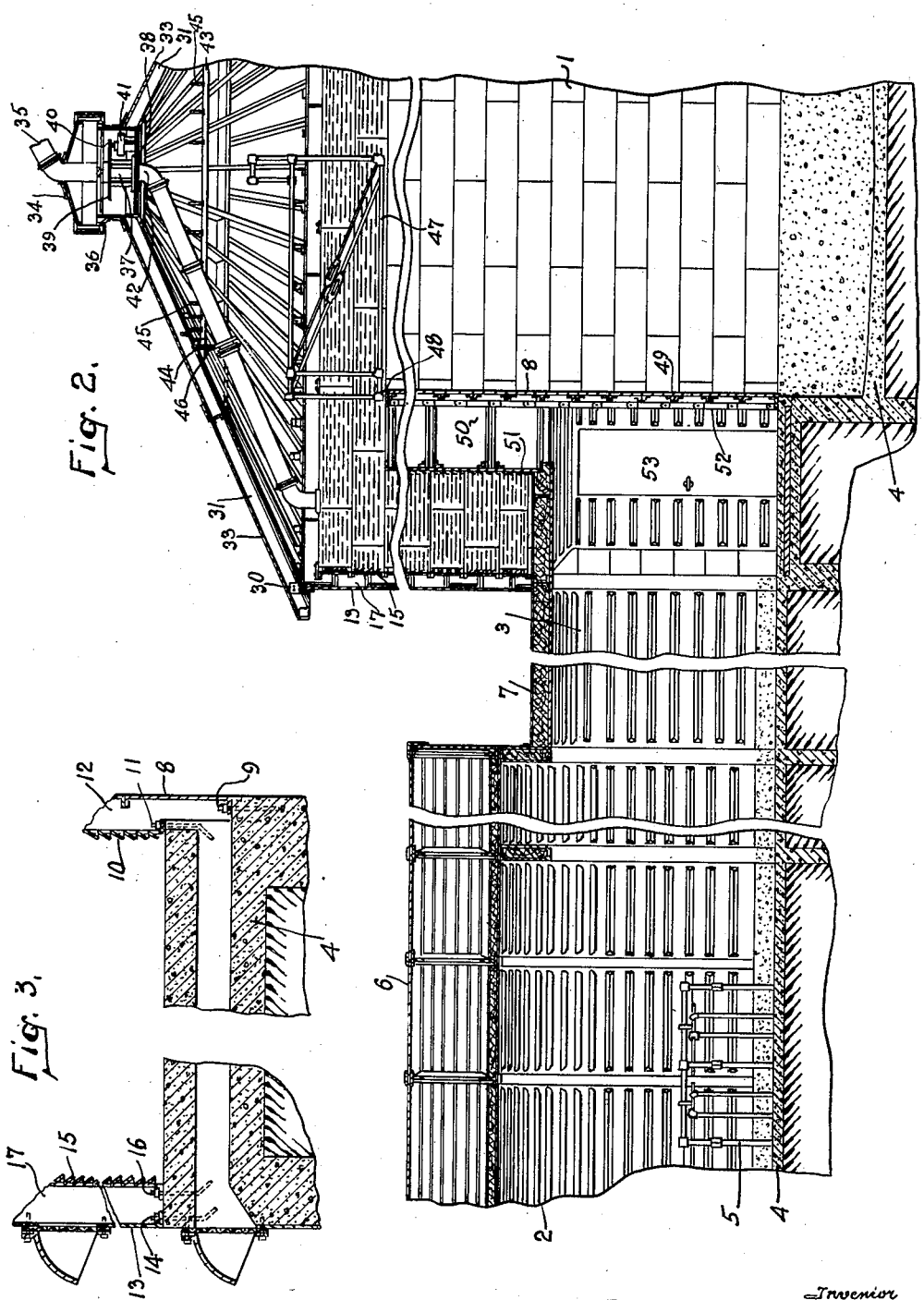
FREDERIC J. KREUTZER, Inventor
BY Toulmin + Toulmin
Attorneys

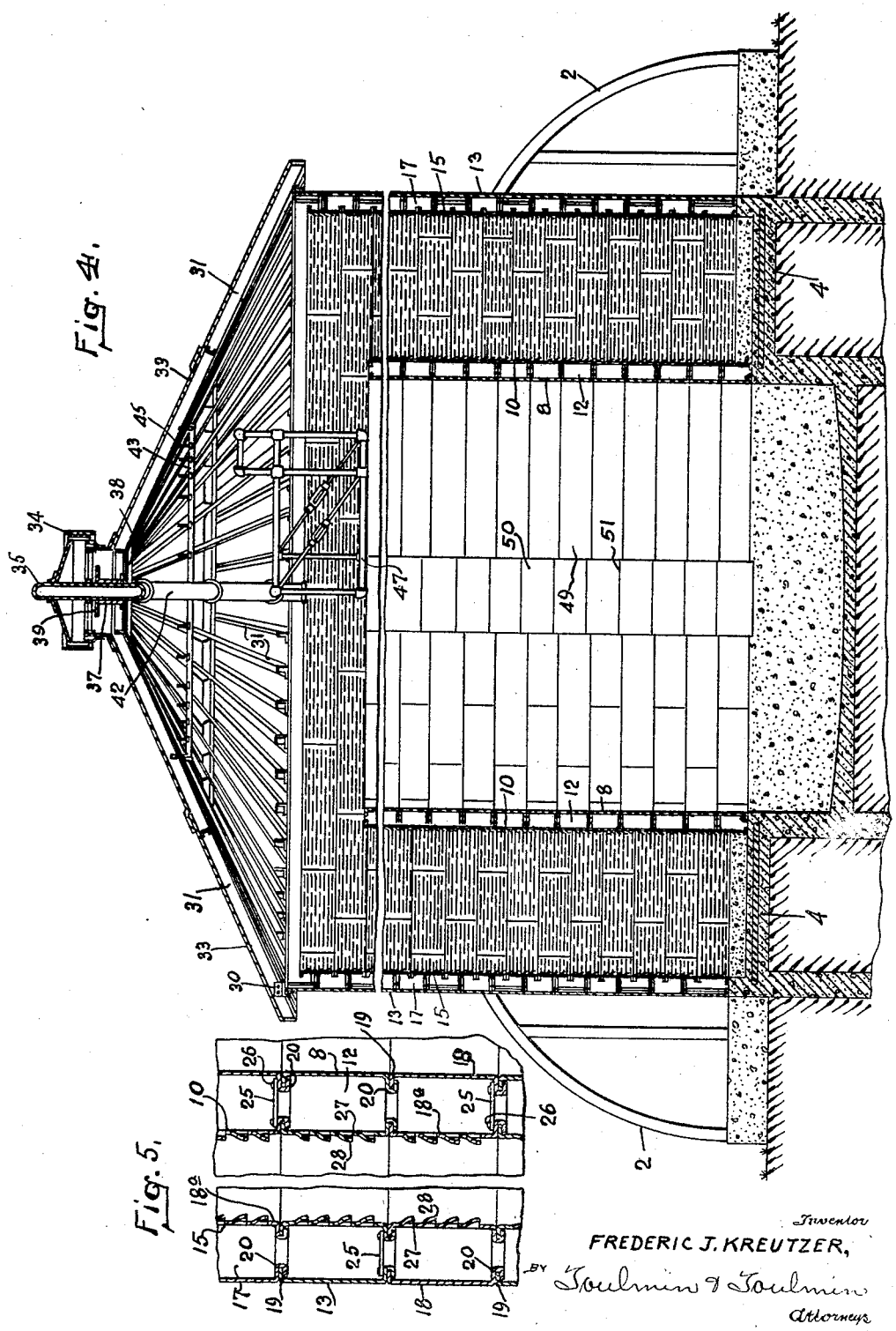

Nov. 20, 1934.   F. J. KREUTZER   1,981,420
PROCESS OF PRESERVING HAY
Original Filed Oct. 10, 1932   4 Sheets-Sheet 4
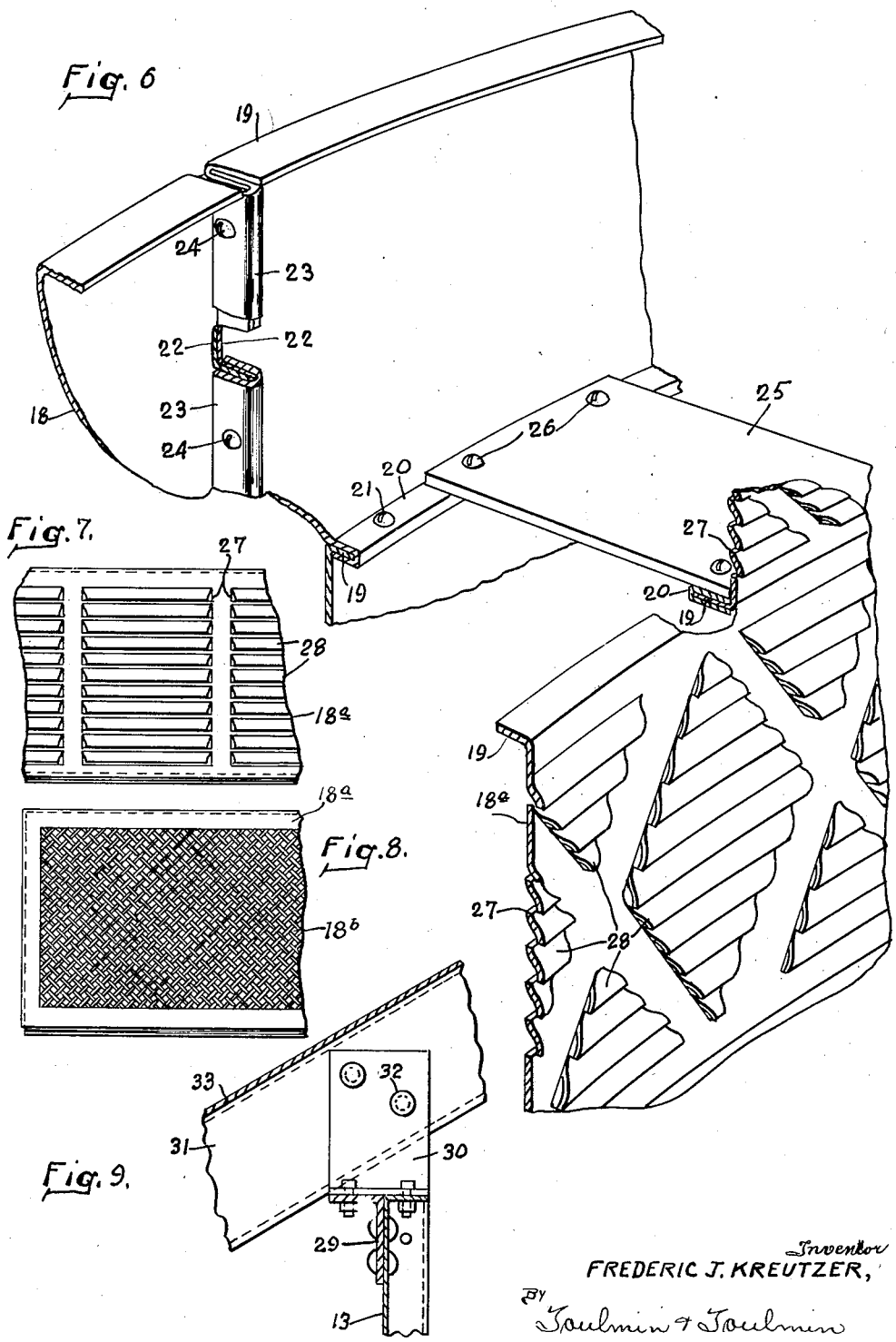
FREDERIC J. KREUTZER, Patented Nov. 20, 1934

1,981,420

UNITED STATES PATENT OFFICE 1,981,420

PROCESS OF PRESERVING HAY

Frederic J. Kreutzer, Elmira, N. Y., assignor to James Manufacturing Company, Fort Atkinson, Wis., a corporation of Wisconsin Original application October 10, 1932, Serial No. 637,027. Divided and this application May 8, 1933, Serial No. 669,896

5 Claims. (Cl. 98—54)

This invention relates to improvements in the method of preserving and storing hay and similar animal feed, and has for its object to provide a process by which it is possible to harvest and store hay and similar feed stuffs without losing the food qualities present therein.

This invention relates to the process of harvesting and storing hay and similar feed in such a manner that all the food qualities are preserved and retained in the same condition as when harvested so there will be an ample supply during the winter of comparatively green feed.

It is an object of this invention to provide a method for storing green feed so it will not be subject to spontaneous combustion and will not produce ignitible gases, or whatever ignitible gases are produced will be readily carried off so that spontaneous combustion is prevented.

These and other advantages will appear from the following description taken in connection with the drawings.

This is a division of my copending application, Ser. No. 637,027, filed October 10, 1932.

Referring to the drawings:

Figure 2 is a vertical, longitudinal section through a silo, a stable and a corridor connecting the stable to the silo, with a part of the silo and a part of the stable broken away.

Figure 3 is a vertical section through one part of the silo, showing the clean-out passageway and the ventilating openings.

Figure 4 is a vertical section taken at right angles to the section on which Figure 2 is taken.

Figure 5 is a detail view showing the construction of the foraminous walls.

Figure 6 is a detail view showing the construction of the walls and the relation between the outside wall and the foraminous wall adjacent thereto, and the manner in which they are connected.

Figure 7 is a slightly modified form of foraminous wall.

Figure 8 is a further modification of a foraminous wall.

Figure 9 is a detail view showing the manner in which the rafters are connected to and supported by the wall of the silo.

Figure 1:
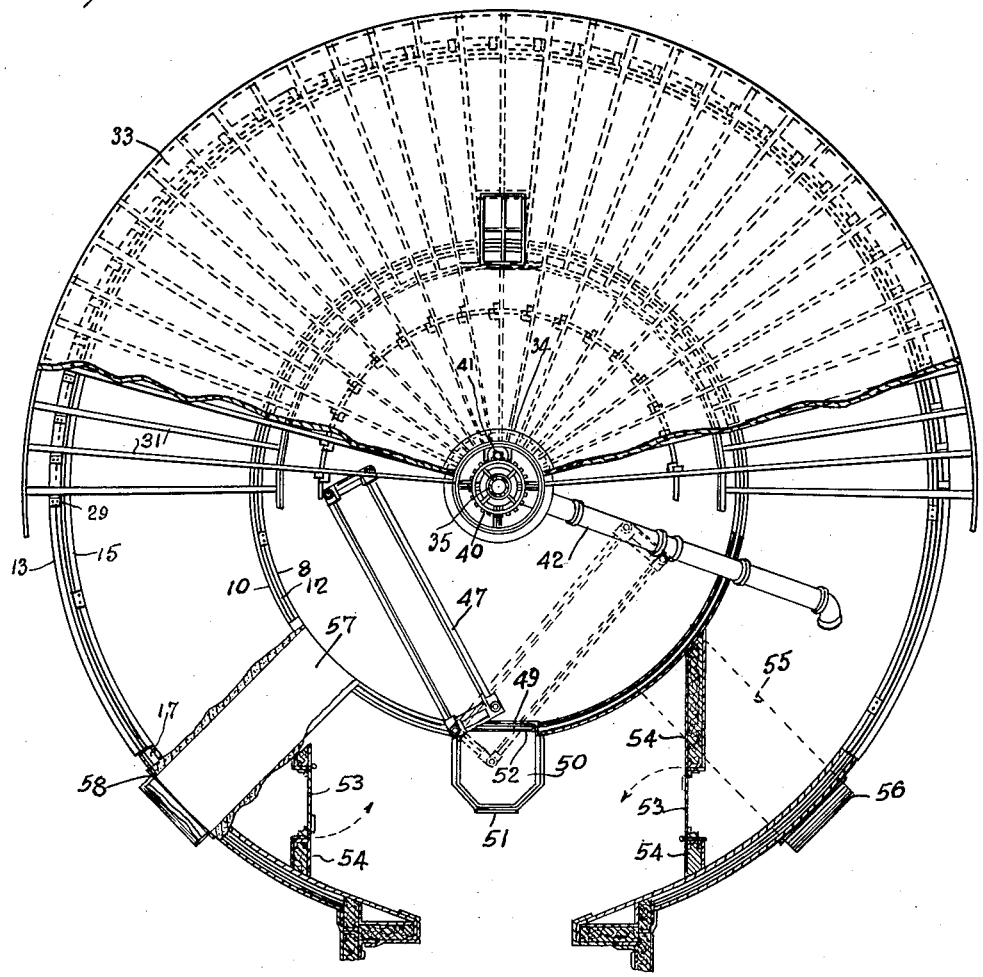
Figure 1 is a top plan view of a silo with a part of the roof removed and a part of the wall structure shown in section.

In Figure 2 there is shown part of a silo 1, part of a stable 2 and a corridor 3 connecting the stable to the silo. The stable, corridor and silo have a floor 4. In the stable are the usual stalls 5 for cattle. The stable has a roof 6 and a similar roof structure 7 is provided in connection with the corridor.

The inside wall of the silo is indicated by the numeral 8 and is composed of a plurality of sections, later to be described. This wall is attached to the floor and the base construction by means of bolts 9. Around the wall 8 and spaced therefrom is a foraminous wall 10, supported on the floor and base structure and attached thereto by means of bolts 11. The space between the wall 8 and the wall 10 is indicated by the numeral 12, and provides an air circulating channel for the free discharge of air from the top to the bottom and from the bottom to the top of the silo.

The outside wall 13 of the silo is attached to the floor and base structure by means of bolts 14. Just on the inside of the outer wall is a foraminous wall 15, supported on the floor and base structure and attached thereto by means of bolts 16. Between the outer wall 13 and the foraminous wall 15 is a space 17, which provides a passageway for the circulation of air.

The outer wall 13 is composed of a plurality of interlocking sheet metal sections 18. The inner wall is composed of a plurality of similar interlocking sections 18a. The upper edge of each section, whether 18 or 18a, is bent laterally to form a flange 19, while the lower edge of each section is bent to form a loop 20 which fits over the flange of an immediately lower section and is attached thereto by means of screws, bolts or rivets 21. By this interlocking construction the sections are built up, one on top of the other, and are air and moisture-proof at their points of connection.

The lateral ends of each section are bent to form flanges 22 so that the ends of two adjacent sections may abut and have their flanges lie side by side. These flanges are inclosed by means of a U-shaped channel member 23, which has passing through it and the flanges on the abutting sections, screws, rivets or bolts 24. When all of the various sections are put together there is one complete wall, either the inside or outside wall, or one of the foraminous walls, all being constructed alike.

The outside wall is attached to the adjacent foraminous wall by means of metal tie plates or bars 25. These bars are attached to the interconnecting parts of the sections, as shown clearly in Figure 6, by means of screws, rivets or bolts 26. The inner wall and its adjacent foraminous wall are connected by similar bars, in a similar manner. The sections composing the foraminous walls have slits 27. The part of the section adjacent and above each slit is pushed in to form an inwardly and downwardly extending projection 28. These projections form downwardly extending passageways through which air may pass from the space between the foraminous walls and the other walls. There is thus formed a container which is liquid-proof and one that will remove electric currents.

On the top of the outer wall 13 is a plurality of brackets 29 attached to the wall by means of rivets, bolts or any other suitable means. To these brackets are attached vertically extending brackets 30, which have attached thereto the lower end of a rafter 31 by means of rivets or bolts 32. Supported on top of the rafters is a roof 33. The roof is cone-shaped and has at its apex a cupola 34, through the top of which extends a tube 35, the end of which is supported by means of a spider member 36 attached to the cupola.

Immediately below the spider 36 is a sleeve 37, rotatably supported by means of a spider support 38. Each of these spiders is supported in the cupola. The sleeve is supported by this spider so it will rotate, and for that purpose is provided on its upper end with a gear 39 in mesh with a pinion 40 on the shaft of a motor 41 supported on the spider 38.

To the sleeve 37 is attached one end of a chute 42. This chute is composed of sections that are adjustable and removable so that the length of the chute may be varied. On the rafters, intermediate their ends, there is provided a track 43 on which there travels a trolley 44. This track is supported by means of brackets 45 extending from the rafters to the track. The trolley is connected to the chute by means of a hanger 46.

Suitably supported on some part of the inner wall is a platform 47, pivoted at the point 48 for swinging movement. The silo is provided with a plurality of removable wall sections 49, through the wall 8 and its adjacent foraminous wall. The openings provided by the removal of these sections lead into a feed discharge chute 50, which has therein removable wall sections 51 to provide openings from the chute into the storage chamber formed by the annular space between the two foraminous walls. There is provided a ladder 52. This ladder is located within the chute 50. There is also provided doors 53 leading from the inner end of the corridor into the storage chamber. These doors are in walls 54 extending between the foraminous walls, the one adjacent the outside and the other adjacent the inside wall.

Located in the floor beneath the upper surface thereof is an air inlet passageway 55, which has over its outer end a hood 56. Above this air inlet passageway and in the wall 13 is an air inlet 57, which has over it a hood 58 similar in shape to the hood 56. At the outer end of the air inlet passageway and over the air inlet is a screen 59 to catch dust, dirt and prevent the entrance of rats, mice and other small animals into the silo.

The passageway 55 serves as a passageway for outside air into the space between the wall 8 and its adjacent foraminous wall. The air passing in through the inlet 57 and the passageway 55 passes up through the space between the foraminous walls and their adjacent walls.

As the air passes up through these passageways some of it is diverted downwardly into the storage chamber and circulates through whatever feed, hay or other material is stored in the storage chamber. This air passing through the passageways will work up through the material and escape through the top of the silo, the cupola being provided with ventilating space for that purpose.

By means of the chute the hay or other material is distributed to various parts of the storage chamber, and because of the foraminous nature of the walls the air passes through the walls into the materials stored in the storage chamber. The foraminous walls being made of thin material, such as sheet metal, air can easily circulate from the passageway, which entirely surrounds both foraminous walls, and enter into the storage chamber and permeate all of the fodder, hay or feed stored therein.

The feed materials to be stored and preserved are first chopped up or severed into small sections that are easily dried out. Chopped-up hay is stored and deposited in the annular chamber around a central silo or ensilage chamber. This silo or ensilage chamber has water-proof walls composed of sheet metal and is adapted to contain chopped green feed, and in order to prevent the feed in the silo from freezing it is surrounded by the hay chamber. The materials are removed from the two chambers, the hay chamber and the ensilage chamber, so the materials are maintained at a substantial level, or at least the ensilage within the silo is below the level of the hay in the surrounding chamber. By this means the ensilage is protected. The materials are removed for feeding purposes so that this level is not destroyed.

Wherever herein the silo is referred to, or ensilage is mentioned, it will be understood that such expressions include or refer to grain, particularly corn, as the most usual kind of ensilage is composed of corn—stalks, blades, shucks, cobs, and grains, all when ground or cut into small fragments forming ensilage.

It is to be understood that the term "peripheral" in the specification and claims is not to be considered as limiting the shape of the horizontal section of the hay container to any particular form, though a circular form is preferable.

To facilitate an understanding of the process set forth in this specification, we deem it expedient to summarize the process by reference to the successive steps. These steps are as follows:

(1) Harvesting the growing crop of hay.

(2) Chopping up such green hay and storing such chopped hay in a green state in a storage chamber.

(3) Harvesting growing corn.

(4) Chopping up such corn and storing it in a storage chamber surrounded by the hay storage chamber.

(5) Curing such chopped corn into ensilage within such inner chamber.

(6) Aerating such stored hay by air drafts to dry out the moisture content.

(7) Dissipating by the action of the air drafts any spontaneous heat that tends to accumulate in the green hay.

(8) Conveying said now cured chopped hay and said ensilage to a stock-feeding place.

The foregoing recital comprehends practically all of the steps involved in the process in question. Of course, some of these steps are of larger value and more important than some of the others, as indicated by the fact that all of these steps are not mentioned in some of the claims.

It will be understood that I desire to comprehend within my invention such modifications as come within the scope of my claims and my invention.

Having thus fully described my invention, what I claim as new and desire to secure by Letters Patent, is:

1. In a method of harvesting and storing green feeds, storing ensilage in a silo, surrounding the silo with a relatively thin wall of green hay, circulating air between the silo and the hay and through the outside wall of hay, and reducing the level of the ensilage and of the hay approximately alike as they are consumed, whereby the hay is maintained in green condition and the ensilage is prevented from freezing.

2. In a method of harvesting and storing green feeds, chopping corn while green, storing it in a liquid-proof container, chopping hay while green and storing it in a foraminous container about the liquid-proof container of ensilage, and circulating air through the body of the hay while retaining the liquid ensilage without freezing in the silo.

3. In a method of harvesting and storing green feeds, chopping corn while green, storing it in a liquid-proof container, chopping hay while green and storing it in a foraminous container about the liquid-proof container of ensilage and circulating air through the body of the hay while retaining the liquid ensilage without freezing in the silo, and removing the ensilage and hay in such quantities that the level of the two bodies will remain substantially the same at all times.

4. In a process of harvesting and storing hay, the following steps: harvesting the hay, chopping the hay in a green state, storing the chopped hay in a weatherproof container having two spaced peripheral enclosing walls, the outer an imperforate wall and the inner a foraminous wall, and having two interior spaced walls, the innermost an imperforate wall and the other a foraminous wall, and conducting air through the spaces between the spaced walls, through the foraminous walls and thence into and through the hay located between the foraminous walls during storage of the hay.

5. In a process of harvesting and storing hay, the following steps: harvesting the hay, storing the hay in a weatherproof container having two spaced peripheral enclosing walls, the outer an imperforate wall and the inner a foraminous wall, and having two interior spaced walls, the innermost an imperforate wall and the other a foraminous wall, and conducting air through the spaces between the spaced walls, through the foraminous walls, and thence into and through the hay located between the foraminous walls during storage of the hay.

FREDERIC J. KREUTZER.